United States Patent [19]
Boivin et al.

[11] Patent Number: 6,143,162
[45] Date of Patent: Nov. 7, 2000

[54] PROCESS FOR SEPARATING OXYGEN FROM A GASEOUS MIXTURE CONTAINING IT AND DEVICE FOR PRACTICING THIS PROCESS

[75] Inventors: Jean-Claude Boivin, Villeneuve d'Ascq; Pascal Del Gallo, Gif sur Yvette; Jacques Fouletier; Michel Kleitz, both of Grenoble; Philippe Labrune, Saint Maur; Gilles Lagrange, Forges-les-Bains; Gaetan Mairesse, Villeneuve d'Ascq; Guy Nowogrocki, Lille; Marlu Cesar Steil, Grenoble, all of France

[73] Assignee: L'Air Liquide, Societe Anonyme pour l'Etude et l'Exploitation des Procedes Georges Claude, Paris Cedex, France

[21] Appl. No.: 09/181,090
[22] Filed: Oct. 28, 1998

[30] Foreign Application Priority Data

Oct. 29, 1997 [FR] France .................................. 97 13568

[51] Int. Cl.⁷ ..................................................... C25C 1/10
[52] U.S. Cl. .......................................... 205/634; 204/291
[58] Field of Search ..................................... 204/291, 265, 204/266; 205/634

[56] References Cited

U.S. PATENT DOCUMENTS

| | | | |
|---|---|---|---|
| 5,573,655 | 11/1996 | Mairesse et al. | 205/634 |
| 5,582,710 | 12/1996 | Mairesse et al. | 205/634 |
| 5,785,839 | 7/1998 | Kleitz et al. | 205/634 |

FOREIGN PATENT DOCUMENTS

| | | |
|---|---|---|
| 2 695 570 | 3/1994 | France . |
| 2 698 016 | 5/1994 | France . |
| WO 91/06691 | 5/1991 | WIPO . |
| WO 95/32050 | 11/1995 | WIPO . |

OTHER PUBLICATIONS

Fafilek, G. Voltammetry on BICUVOX. 10 Microsamples, Solid State Ionics, vol.: 113–115, Dec. 1, 1998.

by Iharada et al., "Electrochemical characterization of BIMEVOX oxide–ion conductors", *Solid State Ionic; Solid State Ionics*, vol. 48, No. 3–4, Nov. 1991, pp. 257–265.

*Primary Examiner*—Kathryn Gorgos
*Assistant Examiner*—Wesley A. Nicolas
*Attorney, Agent, or Firm*—Young & Thompson

[57] ABSTRACT

Process for separating oxygen from a gas mixture containing it employs a solid-electrolyte electrochemical cell, where the cell includes a homogeneous structure of one or more BIMEVOX derivatives, with dynamic electrodes created "in situ" that are reversible and self-adaptive, and at least two current collectors.

10 Claims, 1 Drawing Sheet

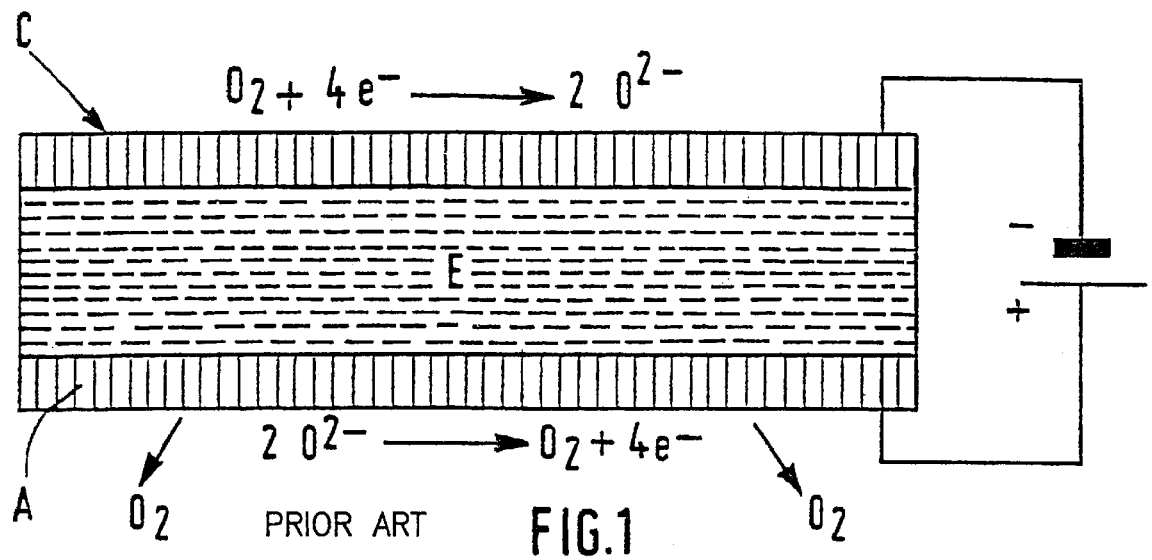

PROCESS FOR SEPARATING OXYGEN FROM A GASEOUS MIXTURE CONTAINING IT AND DEVICE FOR PRACTICING THIS PROCESS

BACKGROUND OF THE INVENTION

The invention relates to a process for separating oxygen from a gas mixture containing it and a device for implementing this process.

DESCRIPTION OF THE RELATED ART

In the field of oxygen separation from air or from a gas mixture containing it, by the use of a solid-electrolyte electrochemical cell, various electrolyte-electrode pairs may be used. The operating principle of an elementary cell is illustrated in FIG. 1.

The oxygen molecules of the said gas mixture are reduced at the cathode (C) into $O^{2-}$ ions which are then transported through the gas-impermeable solid electrolyte (E) due to an electric field; on the other side of the cell, these ions are oxidized at the anode (A) in order to generate oxygen molecules. The performance of the cell therefore depends on the ionic conductivity of the electrolyte and on the ability of the electrode materials to reduce oxygen or to oxidize the $O^{2-}$ ions at the working temperature.

Most solid electrolytes used for separating oxygen from air are stabilized (for example yttrium-stabilized) zirconias. These compounds make it possible to work between 700 and 800° C. (and they are described in U.S. Pat. No. 4,879,016).

A new class of oxides derived from $Bi_4V_2O_{11}$, in which a variable fraction of the vanadium is replaced by an element, for example an alkaline-earth metal, a transition metal, a rare earth or an element from Groups III to V of the Periodic Table of the Elements, is described in the international patent publication WO 91/01274. These oxides are $O^{2-}$ ion conductors and their anionic conductivity at 500° C. is of the same order of magnitude as that of stabilized zirconia at 800° C.

The partial substitution of the constituent elements of $Bi_4V_2O_{11}$ stabilizes the structural type of the gamma phase and maintains, in the $O^{2-}$ ion lattice, a vacancy concentration sufficient to allow anionic conductivity. What is therefore involved is essentially two-dimensional conduction, the oxygen atoms in the $Bi_{2-x}M_xO_2$ layers, which are highly bonded to the bismuth atoms, themselves being unable to move.

The anionic conductivity of these phases is remarkable since it reaches $10^{-3}$ $\Omega^{-1}.cm^{-1}$ at about 200° C.

These derivatives are often referred to by the generic name BIMEVOX.

However, although BIMEVOX-based electrolytes allow $O^{2-}$ ion transfer through their thickness at low temperatures (300° C.), the metal electrodes (Au, Pt) with which they are usually associated are low-flux electrodes which do not allow correct catalytic dissociation of the oxygen molecules brought into contact with them. Moreover, the very structure of this type of electrode considerably reduces the developed surface area of the electrode/electrolyte interface. Furthermore, it has been found that these drawbacks may also be encountered when these electrodes are used with conventional electrolytes, other than those based on BIMEVOX, for example with zirconia stabilized by a dopant, such as yttrium or calcium, or with bismuth oxides $Bi_2O_3$ that are undoped or doped by elements such as magnesium, calcium, yttrium or erbium.

A first approach consisted in producing a volume electrode defined as being a material allowing mixed, ionic and electronic, conduction. This invention is described in international publication WO 95/32050. In the volume electrode, there are at least two constituents, namely a BIMEVOX and a metal or a metal oxide, by way of electronic conductor. These constituents are co-sintered in order to obtain the electrode. The respective particle sizes of these constituents as well as the sintering time are determined so that the structure of the composite layers is sufficiently porous to allow oxygen to diffuse into their respective volumes. In the context of that invention, the BIMEVOX ensures chemical and physical compatibility with the electrolyte and catalytic oxygen dissociation, while the metal or metal oxide has the function of distributing the electrons brought to the surface of the electrode by the current collector throughout the entire three-dimensional structure of this composite electrode.

However, the devices described in the prior art do not make it possible to achieve results sufficiently satisfactory for them to be able to be suitably exploited on an industrial and commercial scale. The Applicants have therefore sought to develop a new process for using BIMEVOX derivatives which does not have the drawbacks explained above.

SUMMARY OF THE INVENTION

The subject of the present invention is a process for separating oxygen from a gas mixture containing it, employing a solid-electrolyte electrochemical cell, characterized in that the said cell comprises a homogeneous structure consisting of one or more BIMEVOX derivatives, with dynamic electrodes created "in situ" that are reversible and self-adaptive, and at least two current collectors.

BRIEF DESCRIPTION OF THE DRAWINGS

The operating principle of an elementary cell is illustrated in FIG. 1.

The general experimental set-up is shown in FIG. 2.

DESCRIPTION OF THE PREFERRED EMBODIMENTS

In the above definition, homogeneous structure should be understood to mean that, unlike in the devices of the prior art, which consist of a solid electrolyte and two electrodes connected to current collectors, it being possible for the said electrodes to be physically distinguished from the said electrolyte, the cell according to the process forming the subject of the invention is a core of one or more BIMEVOX derivatives behaving both as an electrolyte and as electrodes.

In the above definition, those skilled in the art will readily appreciate the difference between a current collector, the function of which is solely to allow the electric current to flow by bringing electrons to the cathode and by gathering them at the anode, and an electrode, the function of which is to catalyse the electrochemical dissociation.

In the above definition, dynamic electrodes created "in situ" should be understood to mean that the electronic conductivity is due to the transformation

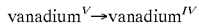
$vanadium^V \rightarrow vanadium^{IV}$ on the cathode side.

In the above definition, created "in situ" should be understood to mean that the homogeneous structure becomes an electrode/electrolyte/electrode structure only by applying a non-zero potential difference to the opposite faces of the said device; in the description below, reference will be made to "electrode regions" and to an "electrolyte region" of the said structure.

In the above definition, reversible should be understood to mean that the device may operate in one direction or in the other by simply reversing the polarity of the current generator.

Self-adaptive should be understood to mean that the device adapts by itself to the two types of functions mentioned above, namely the dynamic function and the reversibility function.

Those skilled in the art will also appreciate that one of the advantages of the homogeneous structure used by the process forming the subject of the present invention is that the thickness of the "electrode regions" and of the "electrolyte region" of the said structure varies, especially with temperature and with the magnitude of the electric current which are applied to it, and that this dynamic character thus makes it possible to control the rate of oxygen extraction.

Thus, the more the magnitude of the applied current increases at constant temperature, the more the thickness of the "electrolyte" region decreases for an increasing rate of oxygen extraction.

A BIMEVOX derivative is denoted by the compound of formula (I)

$$(Bi_{2-x}M_xO_2)(V_{1-y}M'_yO_z) \qquad (I)$$

in which:
M represents one or more metals substituting for bismuth, this (or these) being chosen from those having an oxidation number of less than or equal to 3;
M' represents one or more elements substituting for vanadium, this (or these) being chosen from those having an oxidation number of less than, equal to or greater than 5, the limiting values of x, y, and therefore z, depending on the nature of the substituting elements M and M'.

Among compounds of formula (I), mention may be made of those in which only the vanadium atom is partially substituted by one or more elements. These compositions satisfy the formula (II):

$$(Bi_2O_2)(V_{1-y}M'_yO_z) \qquad (II)$$

in which:
M' is as defined above, y being non-zero;
M' is advantageously selected from alkali metals, alkaline-earth metals, transition metals or else elements from Groups III to V of the Periodic Table, or from rare earths.

Highly stable compositions of high low-temperature conductivity comprise, as metal substituting for vanadium, a transition metal such as Zn, Cu, Ni, Co, Fe, Mn and Cd.

When M' is an alkaline-earth metal, it is especially Ca, Sr or Ba.

In another variant, M' is a metal having an oxidation number equal to 3, such as especially Sb, In or Al.

In yet another variant, M' has an oxidation number of 4. Among such metals, mention may be made of Ti, Sn or Ru.

M' may also represent a substitution element of oxidation number equal to 5, such as Nb, Ta or P.

M' may also be a rare-earth metal.

In another embodiment, M' is an alkali metal, such as sodium, or it may represent Pb with an oxidation number of 2. Among compounds of formula (I), mention may also be made of those in which only the bismuth atom is partially substituted by one or more metals. These derivatives satisfy the formula (III):

$$(Bi_{2-x}M_xO_2)(VO_z) \qquad (III)$$

in which:
x is non-zero and
M is as defined above and is chosen especially from rare earths such as lanthanum.

Among compounds of formula (I), mention may also be made of those in which the oxygen atom is partially substituted by fluorine, or else those which have mixed, bismuth and vanadium, substitutions and correspond to the above formula (I) in which x and y are non-zero.

As a composition of this type, mention may be made of:

$$(Bi_{2-x}Pb_xO_2)(V_{1-y}Mo_yO_z).$$

The BIMEVOX derivative, or the mixture of BIMEVOX derivatives, forming the said homogeneous structure, may be distributed uniformly or with porosity gradients tailored to the use to which it is put, especially so as to promote the penetration and dissociation of gaseous oxygen as well as the recombination of the oxygen ions into gaseous oxygen.

When the structure is composed of several BIMEVOX derivatives, these are chosen and distributed in the said structure so as to preserve its aspects of homogeneity, of dynamic behaviour, of reversibility and of self-adaptation, as described above. In general, the particle size of the BIMEVOX derivative or derivatives is between 0.01 and 50 microns.

In a first variant of the device forming the subject of the present invention, the homogeneous structure of the electrochemical cell employed comprises a single BIMEVOX.

It goes without saying that—specifying the essential constituents of the structure involved in the invention does not exclude the presence of other constituents, as long as these would not interfere to an appreciable extent with the properties required of this structure (ionic and electronic conductivities, porosity, etc.)

Advantageously, this homogeneous structure is applicable to the construction of electrochemical cells for separating or extracting oxygen, from a gas containing it and brought to the cathode surfaces, and to the recovery of this oxygen at the anode sides of this structure, when the cells themselves are interposed in an electric current supply circuit used to create a potential difference between their opposite faces, by means of current collectors in contact with the said structure. When the voltage, induced between the opposing "electrode regions" of the said homogeneous structure according to the invention, is sufficient to allow the reduction of oxygen brought in on the cathode side into $O^{2-}$ ions and the oxidation of the $O^{2-}$ ions transferred through the "electrolyte region", the extracted oxygen molecules may be recovered on the anode side of the structure, namely $$\tfrac{1}{2}O_2(gas)+V_0+2e \leftrightarrow O^{2-}.$$

The electrochemical chain according to the process forming the subject of the invention may therefore be especially represented by the following scheme:

CC/BIMEVOX'/ELECTROLYTE/BIMEVOX"/CC in which:
ELECTROLYTE represents the solid gas-impermeable "electrolyte region", the dopant ME of which BIMEVOX may be especially, but non-limitingly, at least one of the elements chosen from titanium, cobalt, nickel, copper, niobium, manganese and zinc;
CC represents the current collectors which ensure both that the electrons are brought into the "cathode region" and removed from the "anode region". These collectors, for example made of gold, must, of course, be compatible with the BIMEVOX derivatives;

BIMEVOX' and BIMEVOX" represent the two characteristic constituents of the "electrode regions".

The subject of the invention is especially a process as defined above in which the current collectors, connected to each of the "electrode regions" of the homogeneous structure of the electrochemical cell employed, are, independently of each other, made of one or more metals, chosen from gold, silver, platinum, palladium and copper, or made of a metal alloy such as stainless steel.

The form of the current collectors for implementing the process according to the invention may be defined so as to optimize the influx of electrons into the "cathode region" and their removal from the "anode region" of the said structure. In a preferred variant of the process forming the subject of the present invention, a non-zero part of each of the current collectors of the electrochemical cell employed lies inside the homogeneous structure, the said part being in the form of a network, each having more than 500 nodes/cm$^2$, especially in the form of a grid and more particularly in the form of a grid having more than 1000 mesh cells/cm$^2$.

In a second preferred variant of the process of the present invention, the homogeneous structure of the electrochemical cell employed is a volume structure having a thickness t, and in which those parts of the current collectors that are included in the said structure are arranged so as to be parallel to each other.

In another variant of the process forming the subject of the present invention, the homogeneous structure of the electrochemical cell employed is a hollow cylindrical structure of circular or oval cross-section, having two coaxial cylindrical faces, in which structure those parts of each of the current collectors that are included in the said structure are cylindrical grids coaxial with the faces of the said structure.

In the electrochemical chain as defined above, the BIMEVOX, BIMEVOX' and BIMEVOX" derivatives may be identical or different.

The physical conditions with which the homogeneous structure of the electrochemical cell employed in the process according to the invention must comply will, in each case, be determined by those skilled in the art.

In general, it will always be advantageous to use electrolytes having as small a thickness as possible, even if only to reduce the internal voltages.

According to the process forming the subject of the present invention, the separation of oxygen from a gas mixture is carried out at a temperature of between 250 and 700° C. and with a potential difference between the "cathode region" and the "anode region" sufficient to allow reduction of the oxygen brought in on the cathode side into $O^{2-}$ ions and oxidation of the said $O^{2-}$ ions transferred through the solid electrolyte into oxygen on the anode side.

This process is especially suitable for removing oxygen from argon obtained by cryogenic distillation of air or for extracting oxygen from air or else for separating oxygen from nitrogen/oxygen, water-vapour/oxygen, carbon monoxide or dioxide/oxygen, or $NO_x$ or $SO_x$/oxygen mixtures.

In general, the device forming the subject of the present invention is therefore suitable for operations of purifying gases or gas mixtures as well as for operations of analysing the oxygen present in a given gaseous atmosphere.

Thus, it is possible either to produce ultrapure oxygen or, in the case of applications requiring oxygen-free atmospheres, such as the electronic-component industry or the food industry, to remove oxygen from the said atmosphere, the said gaseous atmosphere lying above a liquid or above a solid.

By way of non-limiting example, the process is used to remove oxygen from the gaseous atmosphere lying above food products, especially fresh food products, so that they are better preserved.

A final subject of the present invention is an electrochemical cell as defined above.

The following examples illustrate the invention without, however, limiting it:

ILLUSTRATIVE EXAMPLES

Three illustrative examples are given below. They relate to the following systems:

Au grid (CC)-BICOVOX'/BICOVOX/BICOVOX"-Au grid (CC) (Example 1)

Au grid (CC)-BICUVOX'/BICUVOX/BICUVOX"-Au grid (CC) (Example 2)

Au grid (CC)-BIZNVOX'/BIZNVOX/BIZNVOX"-Au grid (CC) (Example 3).

Production of electrochemical cells

The electrochemical cells are prepared in the following manner:

disc-shaped solid electrolytes are prepared from $Bi_4V_2O_{11}$ derivative powders of formulae $Bi_2Co_{0.1}V_{0.9}O_{5.35}$, $Bi_2Cu_{0.1}V_{0.9}O_{5.35}$, and $Bi_2Zn_{0.1}V_{0.9}O_{5.35}$ (BICOVOX.10, BICUVOX.10 and BIZNVOX.10). To do this, the powders are ground so that the average diameter of the particles is at most of the order of a few microns, the particle size varying from 0.01 to 10 microns. The discs are obtained by pressing, by applying a force of the order of one tonne to the ground powders. They have a surface area of 2 cm$^2$ and a thickness of about 1.5 mm;

the discs are then sintered for 1 to 12 hours between 600 and 900° C. The sintering operations are carried out in an air atmosphere so as to obtain materials that are gas-impermeable and mechanically strong;

a gold grid of controlled mesh (1024 mesh cells per cm$^2$) is deposited, by pressing, on each of the surfaces of the discs;

the gold grid is inserted into a BIMEVOX' layer (ME: Co, Cu, Zn) and into a BIMEVOX" layer on each side of the disc. In the following examples, the BIMEVOX compounds are identical. The BIMEVOX' and BIMEVOX" compounds also serve as binders. The porosity and the particle size are controlled. Next, the system thus produced is sintered at a sintering temperature at least equal to that of the BIMEVOX employed for preparing the first disc; and the structure thus formed is deposited on the end of a conducting tube made of stainless steel. In order to ensure that the disc remains stable on the end of the stainless steel tube and to provide electrical contact, a gold seal is applied. The other electrical contact is provided by an external metal rod, one of the ends of which is in contact with the controlled-mesh gold grid.

The general experimental set-up is shown in FIG. 2.

This set-up comprises a first compartment 21 provided with an air intake 22. Housed inside this compartment is a stainless steel tube 23 provided with an outlet 24. In its upper part, it is provided with a disc 25 formed from a homogeneous structure according to the invention. In order to ensure that the disc remains stable on the end of the stainless steel tube and to ensure electrical contact on the anode side, a gold seal (or cement, known by the trade mark "CERASTIL C3") is applied. The electrical contact on the cathode side is provided by an external metal rod, one of the ends of which is in contact with the gold.

The homogeneous structure 25 is itself inserted into an electrical circuit 26 which is used to apply, via suitable collectors, a potential difference between the two opposing "electrode regions" of the disc 25. The operation may be reversible.

In operation, in the case of electrochemical separation of oxygen from air, the "cathode region" of the disc is brought into contact with air. Pure oxygen is recovered in the stainless steel tube, via the "anode region" of the cell. The stainless steel tube and the metal rod are connected to an electrical generator.

Operating conditions of the cells

All these cells defined by Examples 1, 2 and 3 have operated over a wide temperature range (between 350 and 600° C.) with a variable potential. The results are given in the tables below:

Characteristics of an elementary electrochemical cell:

Au, BIZNVOX.10/BIZNVOX.10/BIZNVOX.10, Au (T=485° C.; 3.6 mm thickness; 16 mm diameter)

| I (mA) | Δv (v) | Current density J (A · cm$^{-2}$) | O$_2$ flux (cm$^3$ · min$^{-1}$ · cm$^{-2}$) | Coulombic efficiency (%) |
|---|---|---|---|---|
| 1000 | 6.6 | 0.5 | 1.84 | 98 |
| 1500 | 7 | 0.75 | 2.78 | 97 |
| 2000 | 7.26 | 1 | 3.70 | 97 |

Comparison of the measured coulombic efficiencies (in %) for various elementary electrochemical cells:

Au, BIMEVOX.10/BIMEVOX.10/BIMEVOX.10, Au (T=585° C.; 3.6 mm thickness; 16 mm diameter)

| ME J (A cm$^{-2}$) | Zn (Example 3) | Co (Example 1) | Cu (Example 2) |
|---|---|---|---|
| 0.5 | 99 | 100 | 96 |
| 0.75 | 99 | 94 | 95 |
| 1 | 100 | 97 | — |

In all specific cases, the coulombic efficiencies are greater than 95%, this being for temperature ranges between 350 and 600° C. The lifetimes of the cells exceed several tens of days. In fact, no reduction in the electrochemical performance nor any aging of the cells was observed during the experiments.

What is claimed is:

1. Process for separating oxygen from a gas mixture containing oxygen, comprising the step of:
   reducing oxygen brought in on a cathode into O$^{2-}$ ions and transferring the O$^{2-}$ ions into oxygen on an anode by employing a solid-electrolyte electrochemical cell having a homogeneous structure consisting of one or more BIMEVOX derivatives, with dynamic electrodes created "in situ" that are reversible and self-adaptive, and at least two current collectors wherein BIMEVOX derivatives are defined by formula $$(Bi_{2-x}M_xO_2)(V_{1-y}M'_yO_z) \qquad (I)$$

in which:

M represents one or more metals substituting for bismuth, this (or these) being chosen from those having an oxidation number of less than or equal to 3;

M' represents one or more elements substituting for vanadium, this (or these) being chosen from those having an oxidation number of less than, equal to or greater than 5, the limiting values of x, y, and therefore z, depending on the nature of the substituting elements M and M'.

2. Process as defined in claim 1, in which the homogeneous structure of the electrochemical cell employed comprises a single BIMEVOX.

3. Process as defined in claim 1, in which the current collectors, connected to electrode regions of the homogeneous structure of the electrochemical cell employed, are, independently of each other, made of one or more metals, chosen from gold, silver, platinum, palladium and copper, or made of a metal alloy.

4. Process as defined in claim 1, in which a non-zero part of each of the current collectors of the electrochemical cell employed lies inside the homogeneous structure, the said part being in the form of a network, each having more than 500 nodes/cm$^2$.

5. Process as defined in claim 4, in which that part of each of the current collectors that lies inside the homogeneous structure is in the form of a grid.

6. Process as defined in claim 4, in which the homogeneous structure of the electrochemical cell employed is a volume structure having a thickness t, and in which those parts of the current collectors that are included in the said structure are arranged so as to be parallel to each other.

7. Process as defined in claim 4, in which the homogeneous structure of the electrochemical cell employed is a hollow cylindrical structure of circular or oval cross-section, having two coaxial cylindrical faces, in which structure those parts of each of the current collectors that are included in the said structure are cylindrical grids coaxial with the faces of the said structure.

8. Process as defined in claim 1 for the removal of oxygen from argon obtained by cryogenic distillation of air, the extraction of oxygen from air and the separation of oxygen from nitrogen/oxygen, water-vapour/oxygen, carbon monoxide or dioxide/oxygen, or NO$_x$ or SO$_x$/oxygen mixtures.

9. Process as defined in claim 1, for removing oxygen from a gaseous atmosphere lying above a given liquid or above a solid.

10. Process as defined in claim 9, for removing oxygen from the gaseous atmosphere lying above food products.

* * * * *